United States Patent
Shivanna et al.

(10) Patent No.: US 8,205,117 B2
(45) Date of Patent: Jun. 19, 2012

(54) MIGRATORY HARDWARE DIAGNOSTIC TESTING

(75) Inventors: Suhas Shivanna, Karnataka (IN); Meera K. Raghunandan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 12/426,303

(22) Filed: Apr. 20, 2009

(65) Prior Publication Data

US 2010/0218048 A1  Aug. 26, 2010

(30) Foreign Application Priority Data

Feb. 25, 2009 (IN) .............................. 419/CHE/2009

(51) Int. Cl.
*G06F 11/00* (2006.01)
(52) U.S. Cl. ................. 714/37; 714/42; 714/44
(58) Field of Classification Search .................... 714/37, 714/42, 44
See application file for complete search history.

(56) References Cited

U.S. PATENT DOCUMENTS

| | | | |
|---|---|---|---|
| 6,237,114 B1 * | 5/2001 | Wookey et al. | 714/47.2 |
| 6,366,945 B1 * | 4/2002 | Fong et al. | 718/104 |
| 7,447,854 B1 * | 11/2008 | Cannon | 711/162 |
| 7,664,940 B2 * | 2/2010 | Conklin et al. | 712/220 |
| 8,015,432 B1 * | 9/2011 | Vaidya | 714/4.11 |
| 2007/0067435 A1 * | 3/2007 | Landis et al. | 709/224 |
| 2007/0094670 A1 * | 4/2007 | Graves | 718/104 |
| 2008/0098262 A1 * | 4/2008 | Ford et al. | 714/25 |
| 2008/0235482 A1 * | 9/2008 | Armstrong et al. | 711/173 |
| 2008/0256530 A1 * | 10/2008 | Armstrong et al. | 717/174 |
| 2009/0089325 A1 * | 4/2009 | Bradford et al. | 707/104.1 |
| 2009/0089616 A1 * | 4/2009 | Chen et al. | 714/25 |
| 2009/0150724 A1 * | 6/2009 | Pramidi et al. | 714/37 |
| 2009/0259890 A1 * | 10/2009 | Lund et al. | 714/35 |
| 2010/0043004 A1 * | 2/2010 | Tambi et al. | 718/103 |
| 2010/0268983 A1 * | 10/2010 | Raghunandan | 714/3 |
| 2011/0004564 A1 * | 1/2011 | Rolia et al. | 705/348 |

* cited by examiner

*Primary Examiner* — Scott Baderman
*Assistant Examiner* — Loan L. T. Truong

(57) ABSTRACT

A method and system of migratory hardware diagnostic testing is disclosed. In one embodiment, a method includes performing a diagnostic test of a hardware component of a first partition of a server using a first test module embedded in the first partition in response to a receipt of a test command, and storing context data associated with the diagnostic test of the hardware component in a memory associated with the hardware component, where the context data indicates a current state of the diagnostic test of the hardware component. Further, the method includes analyzing the context data upon a receipt of an instruction for a migration of the hardware component to a second partition of the server, and continuing the diagnostic test of the hardware component using a second test module embedded in the second partition based on the context data if the migration is performed.

14 Claims, 3 Drawing Sheets

MIGRATORY HARDWARE DIAGNOSTIC TESTING

RELATED APPLICATIONS

Benefit is claimed under 35 U.S.C. 119(a)-(d) to Foreign application Serial No. 419/CHE/2009 entitled "MIGRATORY HARDWARE DIAGNOSTIC TESTING" by Hewlett-Packard Development Company, L.P., filed on 25 Feb. 2009, which is herein incorporated in its entirety by reference for all purposes.

BACKGROUND

A server may be divided into multiple partitions to optimize usage of its resources. The partitioning of the server may be based on a hard partitioning or a soft or logical partitioning. The hard or physical partitioning may physically divide the server into multiple partitions, where each partition acts as a physically independent, self-contained server with its own processors, memory, input/output subsystem and network resources. The soft partitioning may be more flexible with the division, where a single hardware component may be migrated between multiple soft partitions.

Test applications, such as hardware verifiers and exercisers may be used to diagnose health of hardware components, for example, a processor, memory and the like, in the server. The hardware verifiers and exercisers may be based on a number of algorithms which inject different levels of stress into the hardware components to verify the components' health.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method for migratory hardware diagnostic testing is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
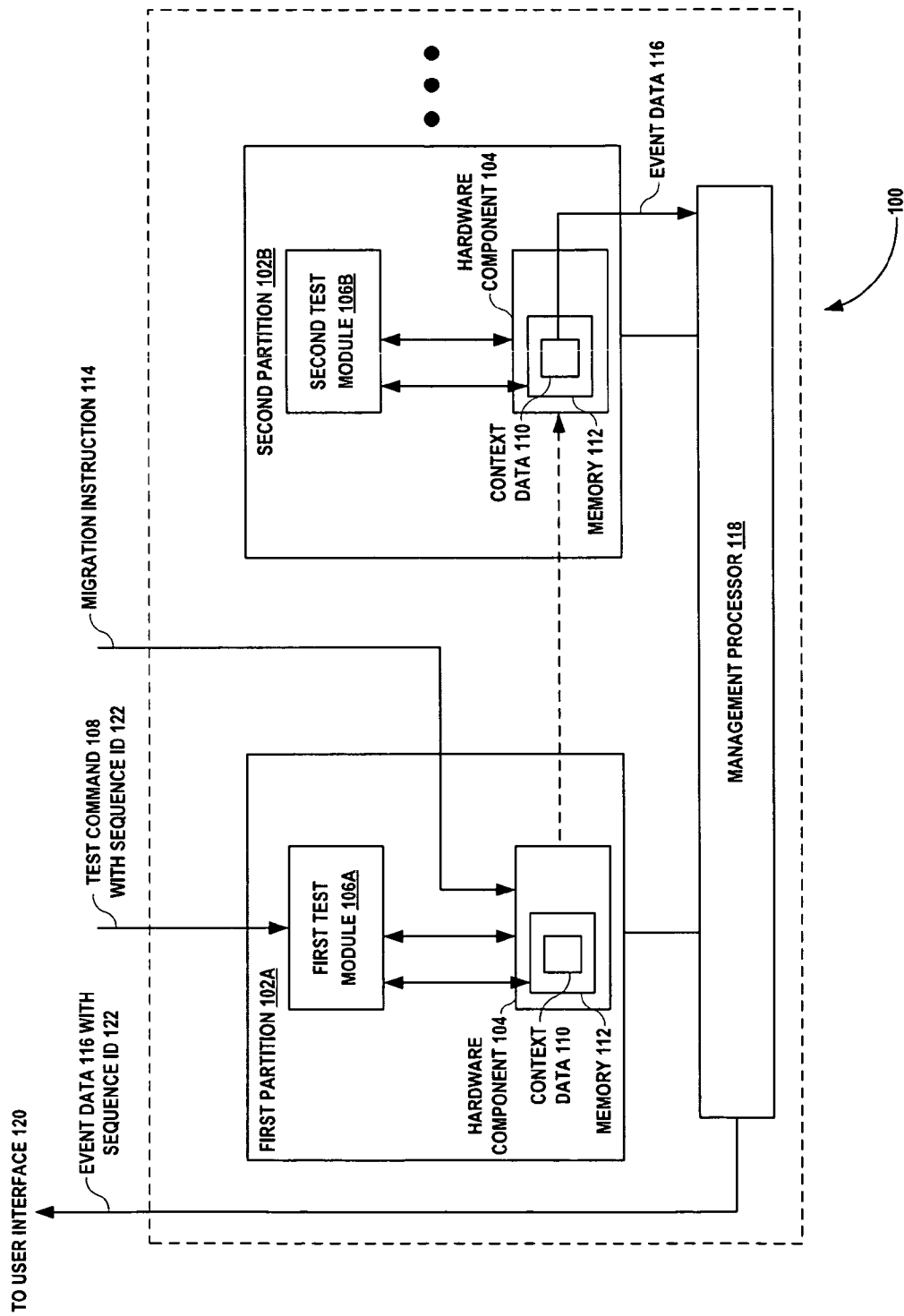
FIG. 1 illustrates an exemplary system for testing a hardware component, according to one embodiment.

FIG. 1 illustrates an exemplary system 100 for testing a hardware component 104, according to one embodiment. Particularly, FIG. 1 shows the system 100 that includes a plurality of partitions, such as a first partition 102A and a second partition 102B, having one or more hardware components, such as the hardware component 104 which may be processor, memory, input/output cards, and the like. The system 100 also includes a management processor 118 communicatively coupled to the first partition 102A and the second partition 102B.

As illustrated, the first partition 102A and the second partition 102B include a first test module 106A and a second test module 106B respectively, for performing a diagnostic test of the hardware component 104. As illustrated in FIG. 1, the hardware component 104 includes a memory 112, for example, a non-volatile memory, for storing a context data 110. In one embodiment, the context data 110 may indicate a current state of the diagnostic test of the hardware component 104, for example, iterations completed before a migration of the hardware component 104 was initiated.

In operation, a diagnostic test of the hardware component 104 of the first partition 102A may be performed using the first test module 106A embedded in the first partition 102A. The diagnostic test of the hardware component 104 may be performed in response to a receipt of a test command 108 with a sequence identification (ID) 122. The test command 108 may be triggered by an application on an operating system of the first partition 102A of the server 100, a centralized error analysis engine in the management processor 118 of the server 100, or a user-initiated command. Further, context data 110 associated with the diagnostic test of the hardware component 104 may be stored in the memory 112 associated with the hardware component 104.

Furthermore, the context data 110 may be analyzed upon receipt of migration instruction 114 of the hardware component 104 to the second partition 102B of the server 100. The storing of the context data 110 may be performed periodically or upon the receipt of the migration instruction 114 of the hardware component 104 to the second partition 102B. In one embodiment, if the migration is performed, the diagnostic test of the hardware component 104 may be continued based on the context data 110 using the second test module 106B embedded in the second partition 102B. Further, the migration of the hardware component 104 to the second partition 102B may be halted if the context data 110 indicates a fault with the hardware component 104.

In accordance with the above mentioned embodiments, event data 116 associated with a progress of the diagnostic test of the hardware component 104 may be forwarded to the management processor 118 of the server 100. Further, the event data 116 may be communicated to a user interface 120 using the management processor 118 of the server 100. In one exemplary implementation, the event data 116 may be tagged with the sequence ID 122 assigned for the diagnostic test of the hardware component 104.

Figure 2:
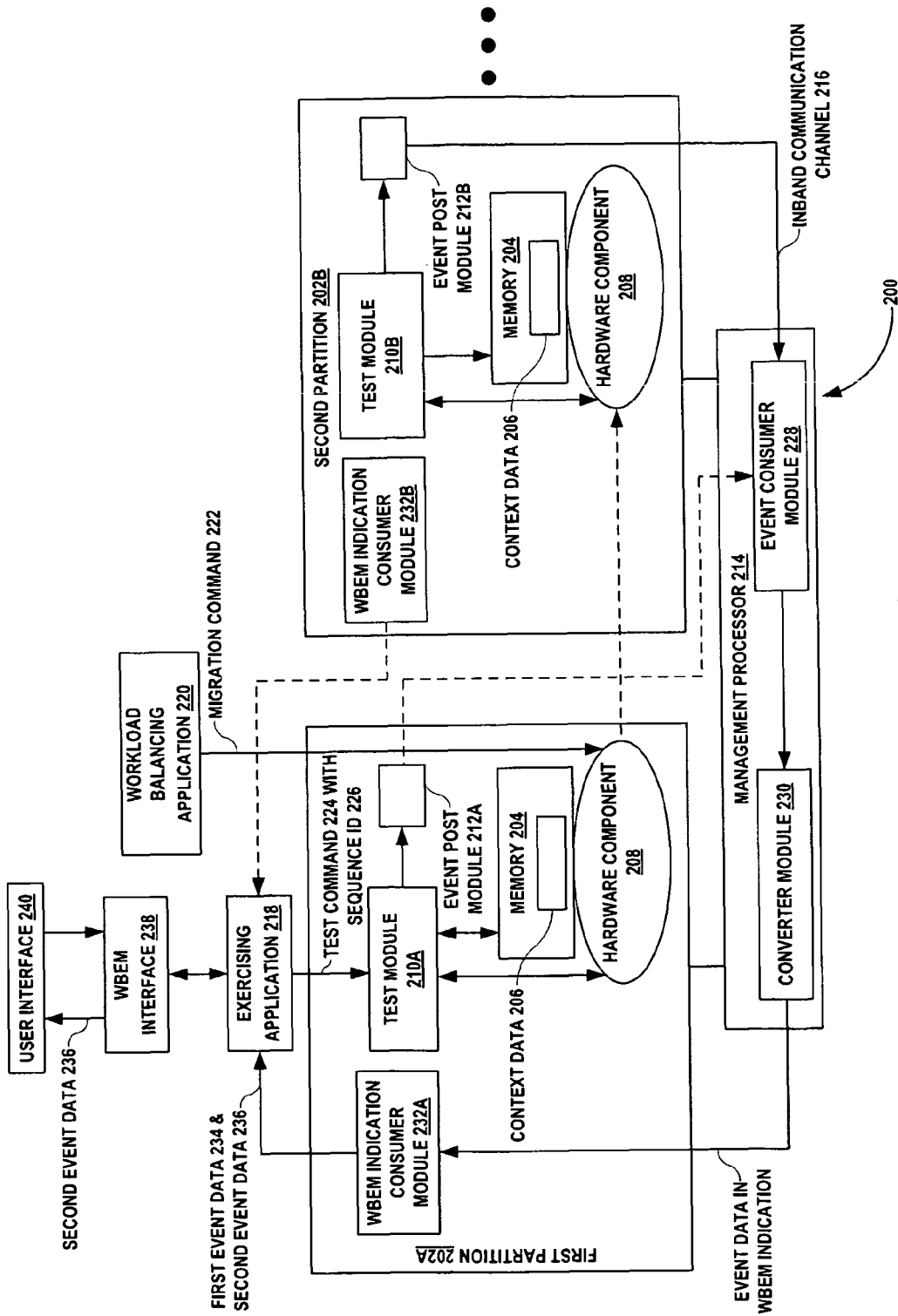
FIG. 2 illustrates an exemplary server device for testing a hardware component, according to one embodiment.

FIG. 2 illustrates an exemplary server device 200 for testing a hardware component 208, according to one embodiment. It is appreciated that the server device 200 is an exemplary embodiment of the system 100 of FIG. 1. As illustrated in FIG. 2, the server device 200 has multiple partitions, such as a first partition 202A and a second partition 202B. The partitions may include one or more hardware components, such as the hardware component 208, migrated from one partition to other based on workload of each partition.

As illustrated in FIG. 2, the hardware component 208 in the first partition 202A includes a memory 204 for storing context data 206. The context data 206 may be associated with a diagnostic test of the hardware component 208 and may be identified using a sequence ID. In one embodiment, the context data 206 may indicate a current state of the diagnostic test of the hardware component 208.

In operation, the diagnostic test of the hardware component 208 may be performed upon receiving a test command 224 from an exercising application 218. In one embodiment, the diagnostic test of the hardware component 208 may be initiated using a user interface 240 via a web-based enterprise management (WBEM) interface 238. For example, the exercising application 218 coupled to the WBEM interface 238 may trigger the diagnostic test of the hardware component 208. In one embodiment, the exercising application 218 may trigger the diagnostic test of the hardware component 208 by invoking a firmware application programming interface and return with a sequence ID 226.

As illustrated in FIG. 2, the first partition 202A and the second partition 202B include a test module 210A and a test module 210B, respectively, for performing the diagnostic test of the hardware component 208. The test module 210A may receive the test command 224 with sequence ID 226. For example, the test command 224 may be received from the exercising application 218 for performing the diagnostic test of the hardware component 208. Further, the context data 206 associated with the diagnostic test of the hardware component 208 may be periodically stored in the memory 204 of the hardware component 208.

Further, as illustrated in FIG. 2, the hardware component 208 may be triggered for a migration using a migration command 222 to a destination partition, such as the second partition 202B. The triggering may be invoked by a workload balancing application 220 based on the workload of each partition. Further, the context data 206 associated with the diagnostic test of the hardware component 208 may be also migrated along with the hardware component 208 to the second partition 202B. Thus, the context data 206 is available to generate a status of the diagnostic test.

Further, the diagnostic test of the hardware component 208 may be continued after the migration based on the context data 206. In other words, the second test module 210B embedded in the second partition 202B may manage the diagnostic test of the hardware component 208 based on the context data 206, for example, if the diagnostic test is unfinished before the migration of the hardware component 208.

The hardware component 208 may not be migrated from the first partition 202A to the second partition 202B if the context data 206 indicates a fault with the hardware component 208. For example, the context data 206 may be analyzed upon receipt of the migration command 222. Also, as illustrated in FIG. 2, the first partition 202A and the second partition 202B include an event post module 212A and an event post module 212B, respectively. The event post module 212A and an event post module 212B may generate and post event data associated with the status of the diagnostic test based on the context data 206.

The event data may include first event data 234, for example, forward progress log intelligent platform management interface (IPMI) event data. Further, the first event data 234 may indicate a percent completion of the diagnostic test if the diagnostic test is unfinished. The event data may also include second event data 236, for example, completed exercising zero event (E0) IPMI event data, which indicates a completeness of the diagnostic test.

As illustrated in FIG. 2, the server device 200 also includes a management processor 214 coupled to the first partition 202A and the second partition 202B for communicating the event data to the exercising application 218 of the test module 210A. Further, as illustrated in FIG. 2, an in-band communication channel 216, for example, inter-integrated circuit bus, communicates the event data. The event data is communicated from the event post module 212A and the event post module 212B to the management processor 214.

As illustrated in FIG. 2, the management processor 214 includes an event consumer module 228 for receiving the event data from the event post module 212A and the event post module 212B. Further, the management processor 214 includes a converter module 230 for converting the event data of the event consumer module 228 in a WBEM indication.

Further, as illustrated in FIG. 2, each of the first partition 202A and the second partition 202B includes a WBEM indication consumer module 232A and a WBEM indication consumer module 232B, respectively. The WBEM indication consumer module 232A and the WBEM indication consumer module 232B may subscribe to the event data in the WBEM indication. Further, the WBEM indication consumer module 232A and the WBEM indication consumer module 232B may forward the event data, for example, the first event data 234 and/or the second event data 236, in the WBEM indication with the sequence ID to the exercising application 218. In one exemplary implementation, the second event data 236 is forwarded by the exercising application 218 to the user interface 240 through the WBEM interface 238.

Figure 3:
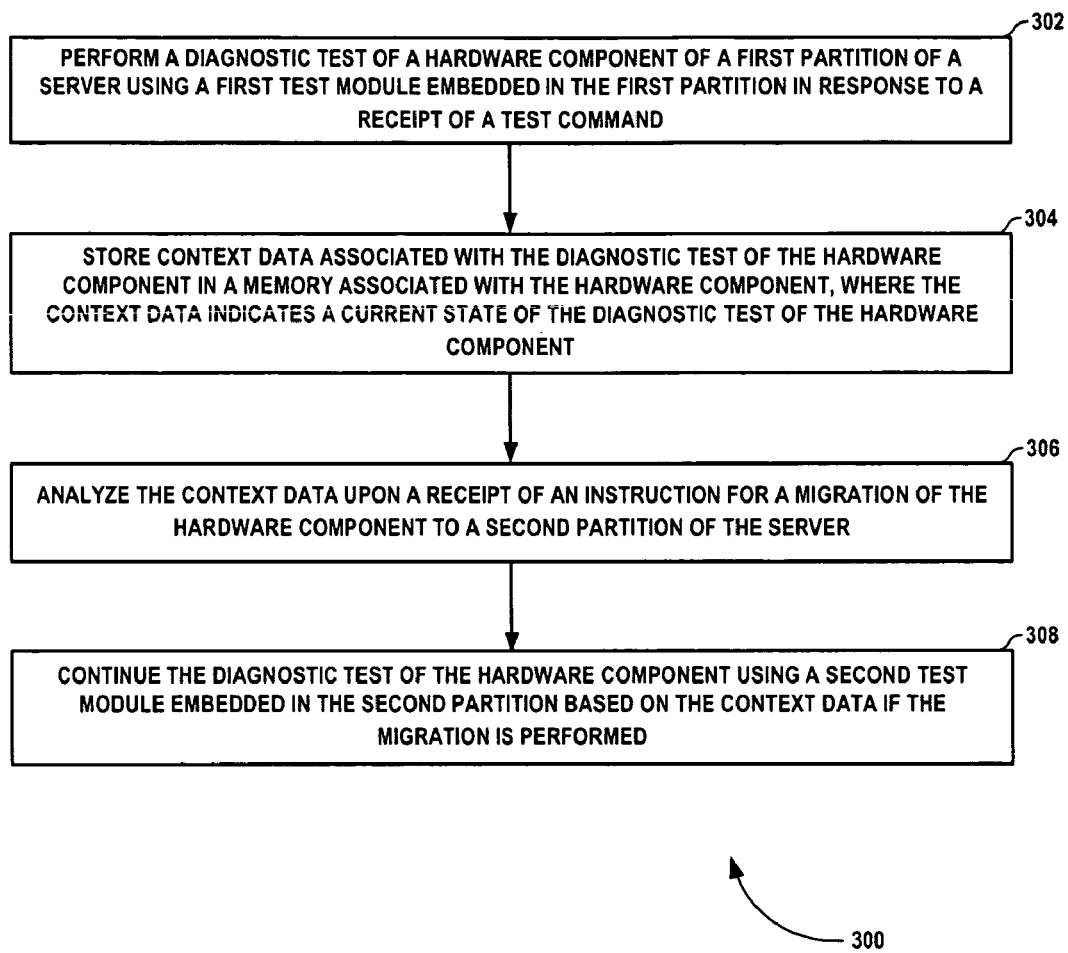
FIG. 3 is a process flow chart for an exemplary method for testing a hardware component of a server with multiple partitions, according to one embodiment.

FIG. 3 is a process flow chart 300 for an exemplary method for testing a hardware component of a server with multiple partitions, according to one embodiment. In step 302, a diagnostic test of the hardware component of a first partition of the server is performed using a first test module embedded in the first partition in response to a receipt of a test command. In one embodiment, the test command may be triggered by an application on an operating system of the first partition of the server or a centralized error analysis engine in a management processor of the server. In step 304, context data associated with the diagnostic test of the hardware component is stored in a memory associated with the hardware component. The context data may indicate a current state of the diagnostic test of the hardware component.

In step 306, the context data is analyzed upon a receipt of an instruction for a migration of the hardware component to a second partition of the server. In one embodiment, storing the context data may be performed periodically or upon the receipt of the instruction for the migration of the hardware component to the second partition. In step 308, the diagnostic test of the hardware component is continued using a second test module embedded in the second partition based on the context data if the migration is performed. The migration of the hardware component to the second partition may be halted if the context data indicates a fault with the hardware component.

In accordance with the above described embodiments, event data associated with a progress of the diagnostic test of the hardware component may be forwarded to a management processor of the server. Furthermore, the event data may be tagged with a sequence ID assigned for the diagnostic test of the hardware component. In addition, the event data is communicated to a user interface using the management processor of the server. Moreover, in one example embodiment, a computer readable medium for testing the hardware component of the server having multiple partitions has instructions that, when executed by a computer, cause the computer to perform the method of FIG. 3.

In various embodiments, the migratory hardware diagnostic testing methods and systems described in FIG. 1 through FIG. 3 may provide a solution for performing diagnostic tests on hardware components in a dynamic environment, where the hardware components may be migrated between different partitions of the server. The methods and systems may focus on the hardware components moving in and out of an operating system (OS) instance online and not on OS absent migration. In various embodiments, the methods and systems may work both in soft and hard partition environment. Further, sanity tests may be allowed to run on the migrated hardware component by embedding the context data in the memory of the hardware components. This also helps eliminate the migration of faulty hardware components to a new partition of the server.

Further, in the embodiments, the exercising applications, for example, applications initiating diagnostic tests, may be transparent to the migration of the hardware components. This may reduce complexity when communicating with the diagnostic stack. Furthermore, applications that initiate diagnostic tests may be decoupled from the applications that actually migrate the hardware components, thus providing an added advantage.

In various embodiments, migratory hardware diagnostic testing may be enabled without need of additional hardware devices. Further, the use of industry standards like IPMI and WBEM may help in giving the various embodiments all the major advantages of a standard based solution. In other embodiment, the partitions of the server may be directly read the IPMI event, for example, event data, from the management processor via the IPMI-block transfer (BT) interface when the partition and the management processor are not connected via a local area network.

In addition, the various operations, processes, and methods disclosed herein may be embodied in a machine-readable medium and/or a machine accessible medium compatible with a data processing system, for example, a computer system, and may be performed in any order, for example, including using means for achieving the various operations. Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, and the like described herein may be enabled and operated using hardware circuitry, for example, a complementary metal oxide semiconductor based logic circuitry, firmware, software and/or any combination of hardware, firmware, and/or software, for example, embodied in a machine readable medium. For example, the various electrical structure and methods may be embodied using transistors, logic gates, and electrical circuits, for example, application specific integrated circuitry.

What is claimed is:

1. A method for testing a hardware component of a server having multiple partitions, comprising:
    performing a diagnostic test of a hardware component of a first partition of a server using a first test module embedded in the first partition in response to a receipt of a test command;
    storing context data associated with the diagnostic test of the hardware component in a memory associated with the hardware component, wherein the context data indicates a current state of the diagnostic test of the hardware component;
    analyzing the context data upon a receipt of an instruction for a migration of the hardware component to a second partition of the server; and
    continuing the diagnostic test of the hardware component using a second test module embedded in the second partition based on the context data if the migration is performed.

2. The method of claim 1, wherein the test command is triggered by one of an application on an operating system of the first partition of the server and a centralized error analysis engine in a management processor of the server.

3. The method of claim 1, further comprising forwarding event data associated with a progress of the diagnostic test of the hardware component to a management processor of the server.

4. The method of claim 3, further comprising communicating the event data to a user interface using the management processor of the server, wherein the management processor is communicatively coupled to the first partition and the second partition.

5. The method of claim 4, wherein the event data is tagged with a sequence identifier (ID) assigned for the diagnostic test of the hardware component.

6. The method of claim 1, wherein the storing the context data is performed periodically or upon the receipt of the instruction for the migration of the hardware component to the second partition.

7. The method of claim 1, further comprising halting the migration of the hardware component to the second partition if the context data indicates a fault with the hardware component.

8. A server device, comprising:
    a plurality of partitions, with each partition comprising:
        a memory for storing context data associated with a diagnostic test of a hardware component;
        a test module for managing the diagnostic test of the hardware component based on the context data; and
        an event post module for generating and posting event data associated with a status of the diagnostic test based on the context data; and
    a management processor coupled to the plurality of partitions for communicating the event data received from the event post module to an exercising application associated with the test module, wherein the management processor comprises:
        an event consumer module for receiving the event data from the event post module; and
        a converter module for converting the event data of the event consumer module in a web-based enterprise management (WBEM) indication.

9. The device of claim 8, wherein the hardware component is triggered for a migration to another partition by a workload balancing application.

10. The device of claim 8, wherein the diagnostic test of the hardware component is identified using a sequence ID.

11. The device of claim 8, wherein the each partition comprises a WBEM indication consumer module for subscribing to the event data in the WBEM indication and forwarding the event data in the WBEM indication with the sequence ID to the exercising application.

12. The device of claim 11, wherein the event data comprises first event data indicating a percent completion of the diagnostic test if the diagnostic test is unfinished and second event data indicating a completeness of the diagnostic test.

13. The device of claim 12, wherein the second event data is forwarded by the exercising application to a user interface.

14. A non-transitory computer readable medium for testing a hardware component of a server with multiple partitions having instructions that, when executed by a computer, cause the computer to perform a method comprising:
    performing a diagnostic test of a hardware component of a first partition of a server using a first test module embedded in the first partition in response to a receipt of a test command;

storing context data associated with the diagnostic test of the hardware component in a memory associated with the hardware component, wherein the context data indicates a current state of the diagnostic test of the hardware component;

analyzing the context data upon a receipt of an instruction for a migration of the hardware component to a second partition of the server; and continuing the diagnostic test of the hardware component using a second test module embedded in the second partition based on the context data if the migration is performed.

* * * * *